April 8, 1969

C. H. STEVENSON III 3,437,219

LOAD HANDLING APPARATUS

Filed Sept. 12, 1966

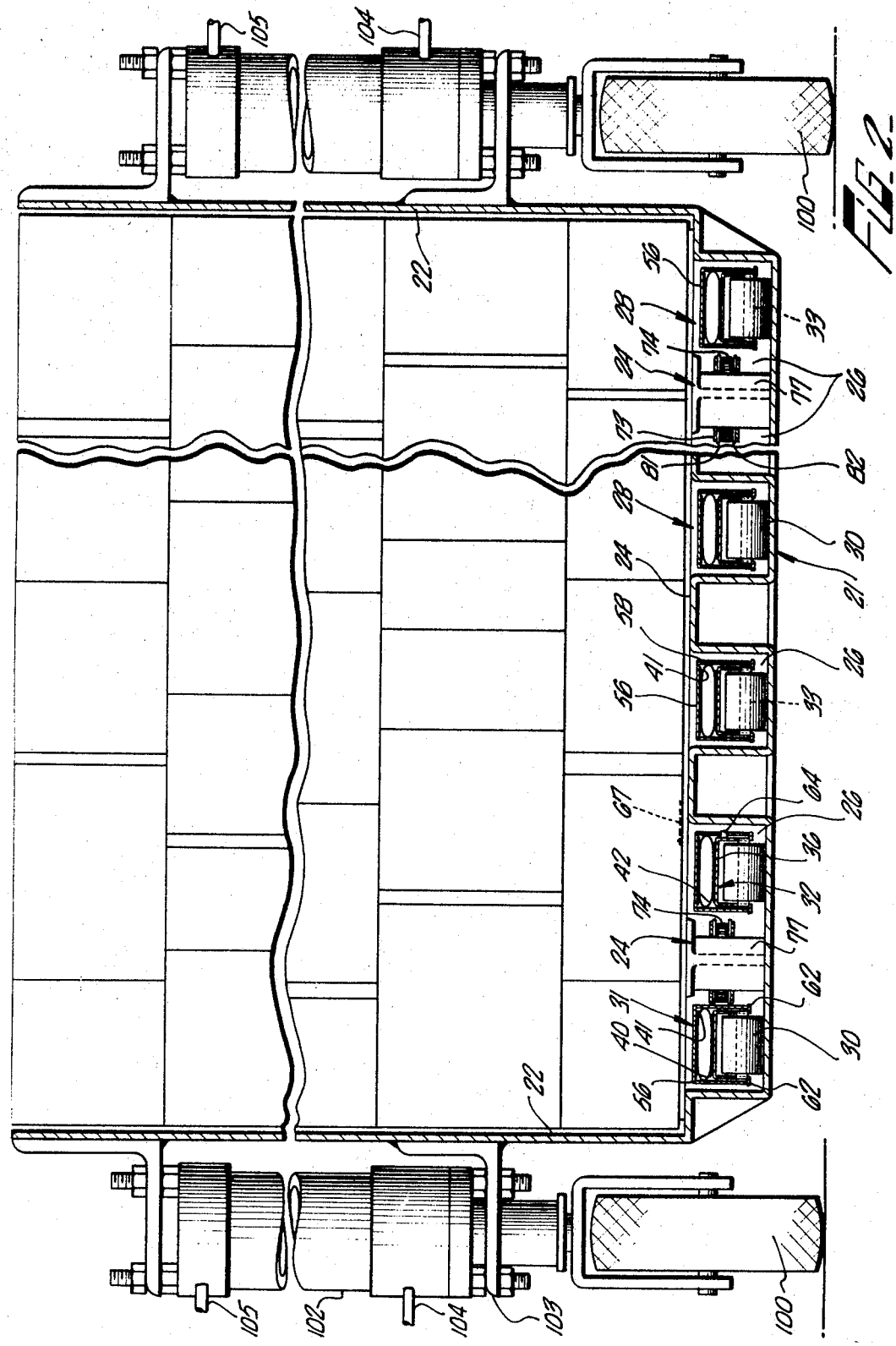

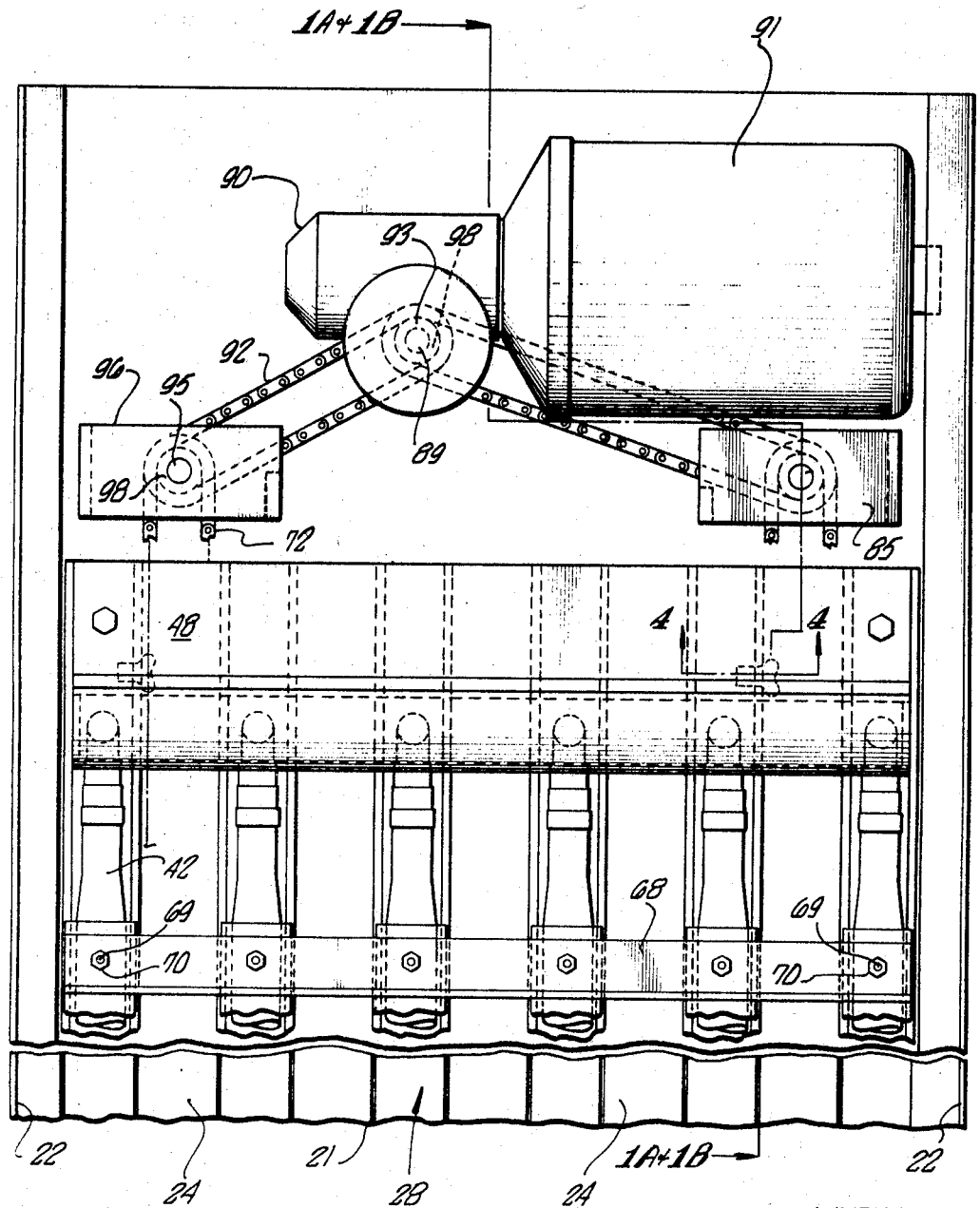

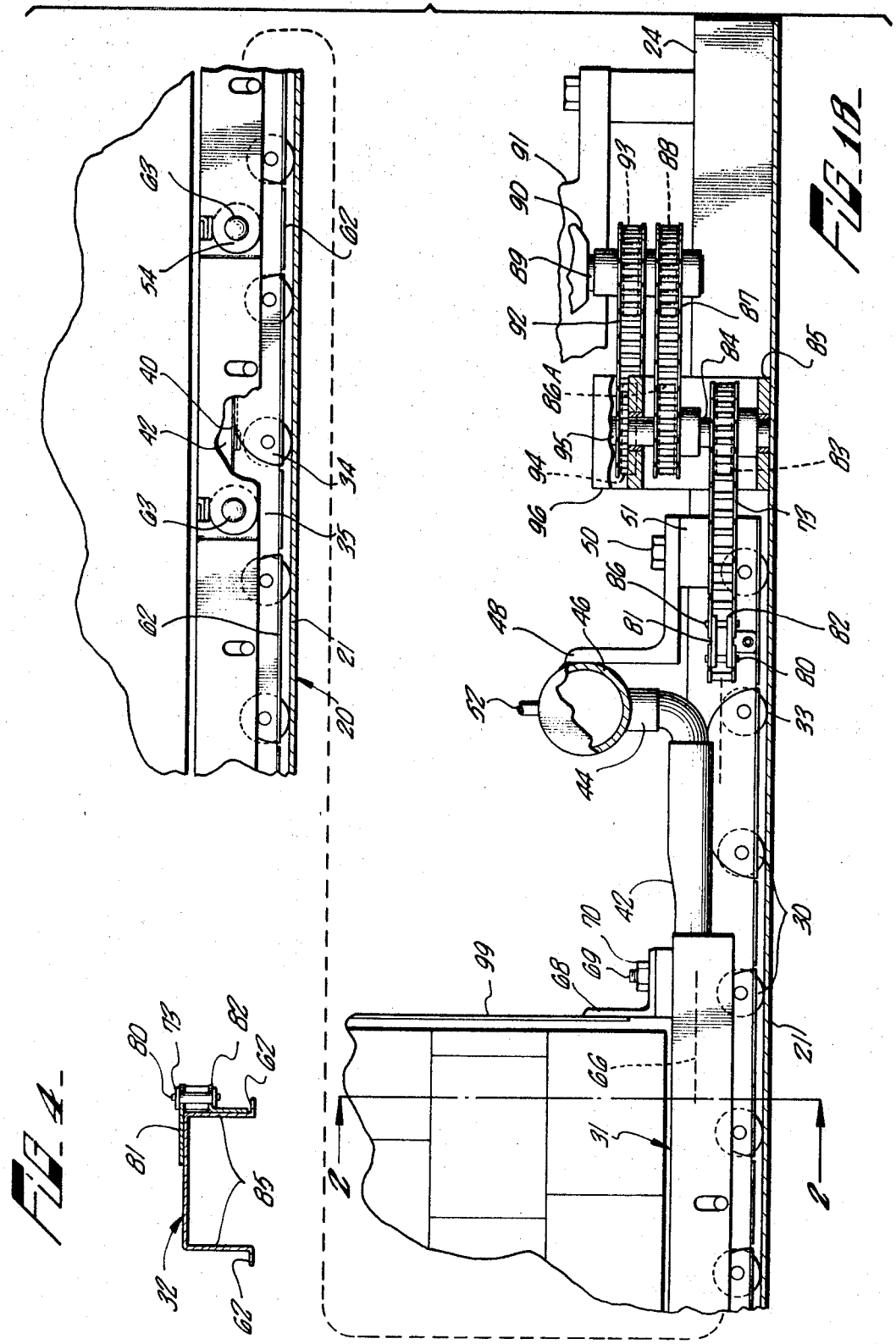

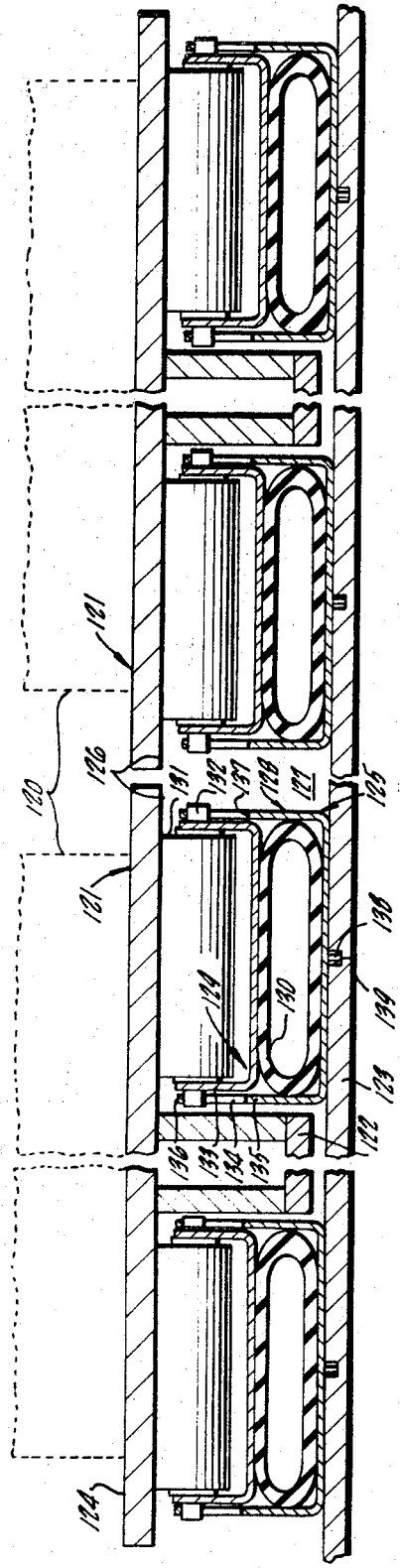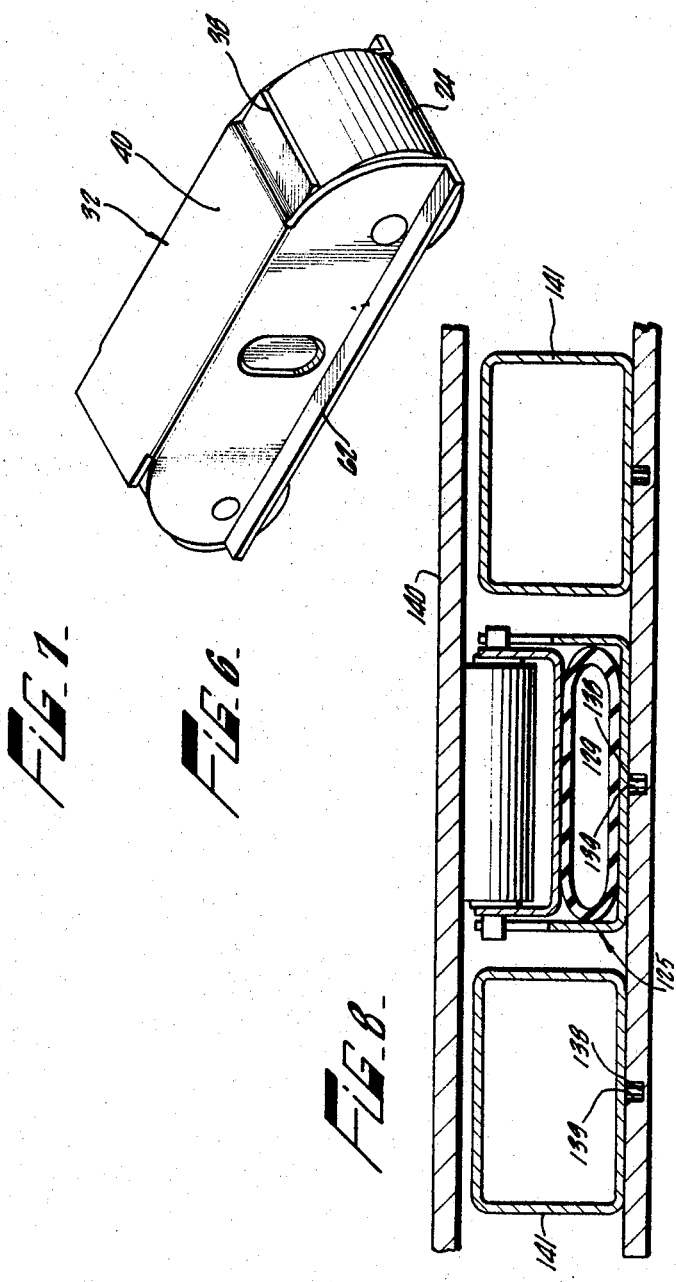

April 8, 1969  C. H. STEVENSON III  3,437,219
LOAD HANDLING APPARATUS

Filed Sept. 12, 1966  Sheet 6 of 9

INVENTOR.
CLARENCE H. STEVENSON III
BY
Christie, Parker & Hale
ATTORNEYS

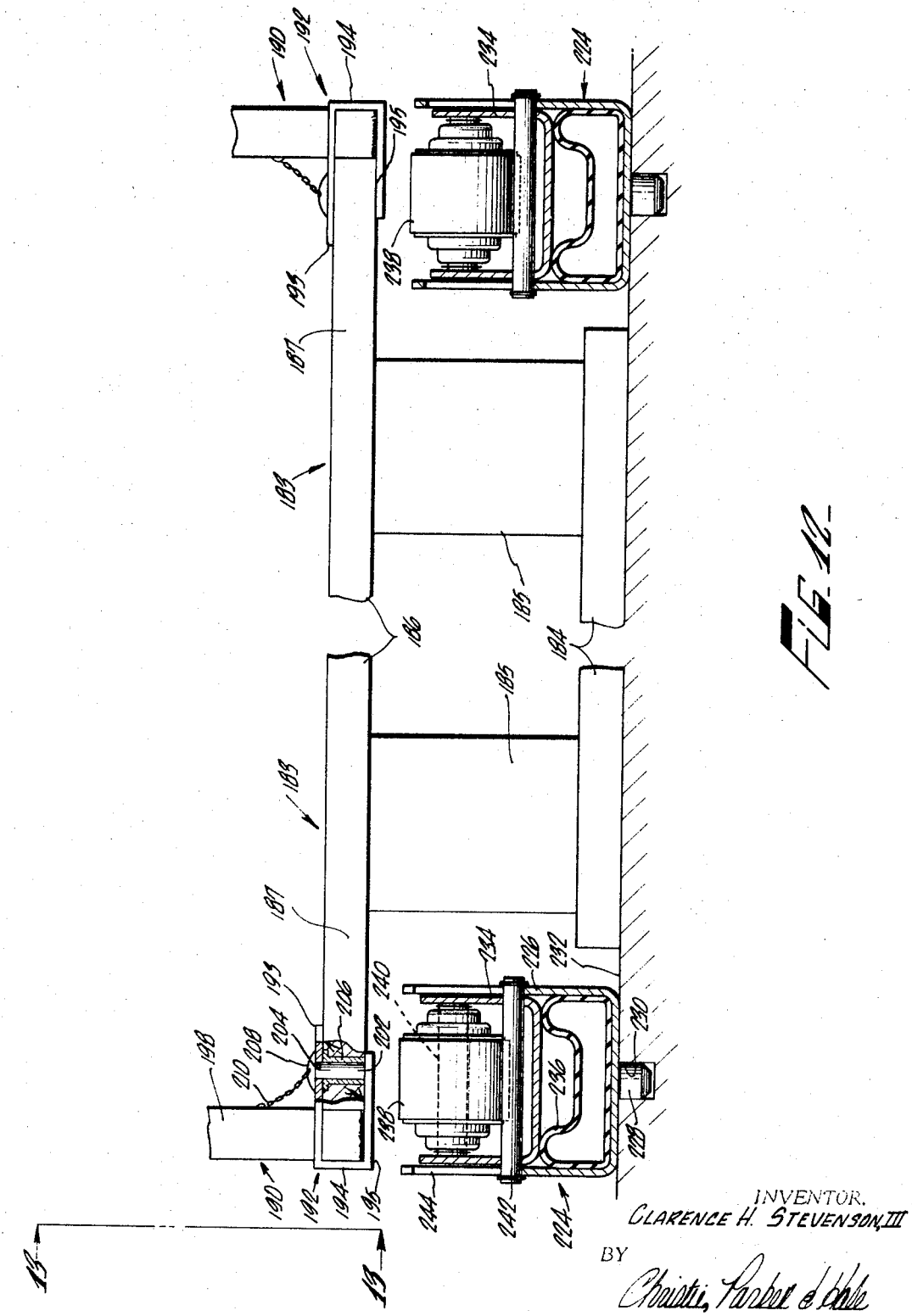

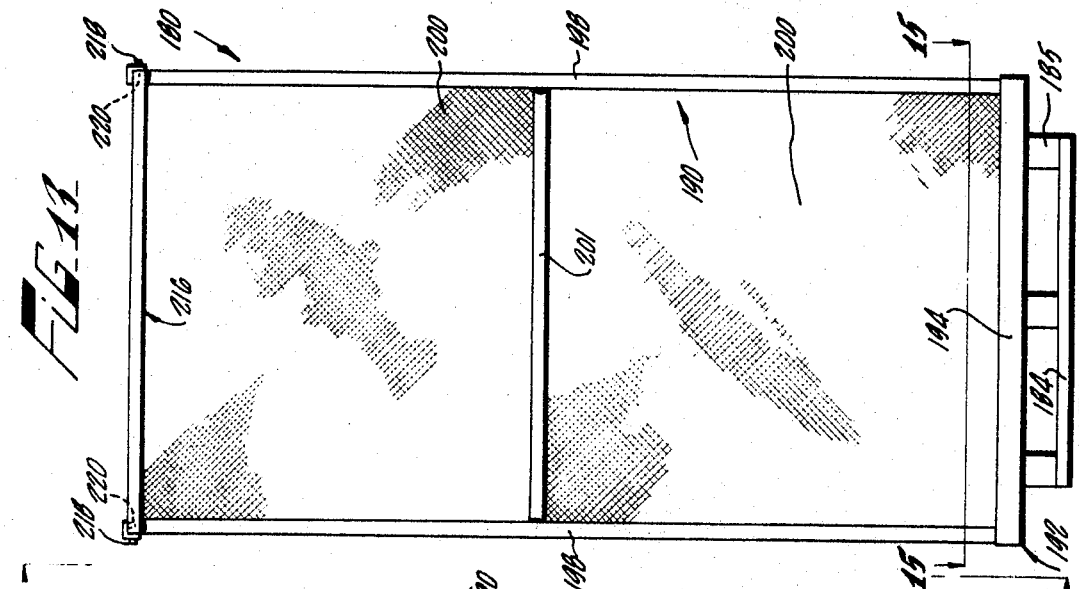

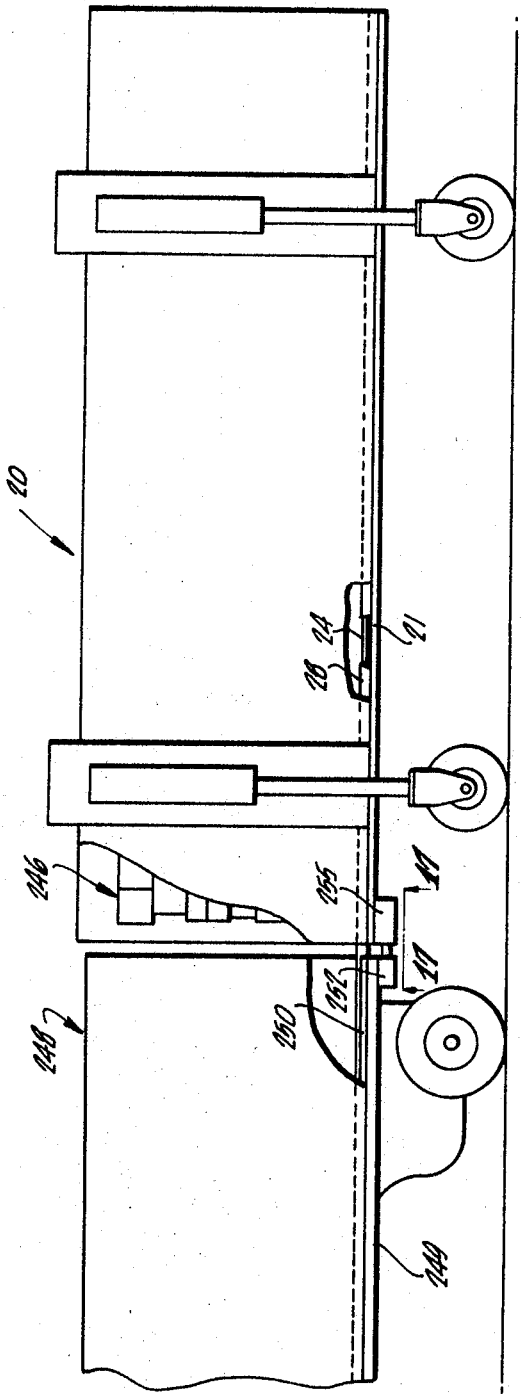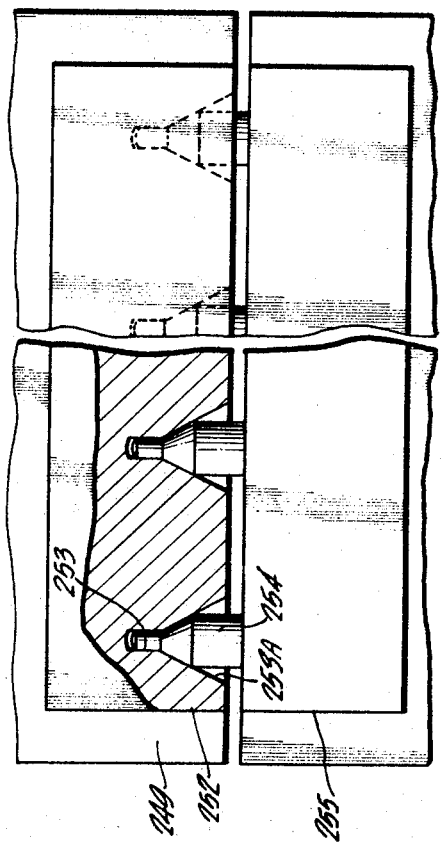

United States Patent Office 3,437,219
Patented Apr. 8, 1969

3,437,219
LOAD HANDLING APPARATUS
Clarence H. Stevenson III, 3430 Angeles Ave.,
Glendale, Calif. 91208
Filed Sept. 12, 1966, Ser. No. 578,821
Int. Cl. B65g *47/52, 13/00, 67/02*
U.S. Cl. 214—38                                     4 Claims

ABSTRACT OF THE DISCLOSURE

Apparatus for transferring a load from a first bed to a second bed includes means for moving the load from one bed to the other, a socket mounted on the first bed to open toward the second bed, and a pin mounted on the second bed to extend toward the socket so the pin enters the socket when the beds are brought together and locks the two beds against relative vertical and horizontal movement as the load is transferred from one bed to the other.

---

This invention relates to apparatus for transferring a load from one location to another.

Although the apparatus can be used in handling a great variety of loads, it is particularly well adapted for transferring large loads between a warehouse and truck.

U.S. Patent No. 2,828,027 discloses apparatus for transferring loads between areas such as warehouses and trucks. The apparatus in that patent can quickly move an assembled load of a variety of packages from a warehouse dock to a truck, or vice versa. The apparatus not only saves labor, it also substantially cuts the waiting time of the vehicle, thereby reducing cost to the ultimate consumer of the goods. The apparatus of this invention is an improvement of that disclosed in U.S. Patent No. 2,828,027.

Briefly, the apparatus of this invention includes a plurality of elongated, laterally-spaced fingers mounted on a first bed to support a load. Each finger is laterally flexible in a vertical plane and horizontal plane to permit it to conform to the contour of the area of the bed on which it rests and accommodate any angular misalignment which may be present between the load supporting means and the bed to which the load is to be transferred. The fingers are constructed to be expandable in a vertical direction so they can be expanded and collapsed as required to raise and lower the load on them. Means are provided for moving the fingers with the load from the bed on which the fingers rest to an adjacent bed. The lateral flexibility of the fingers permits them to be inserted easily under loads which may rest on uneven or warped surfaces, and transfer large loads without uneven distribution of the load on the fingers due to sag or warped condition of the surfaces which support the load.

In the preferred form of the invention, the lateral flexibility of the fingers is achieved by the fingers being constructed of individual members disposed end to end and coupled together at adjacent ends with pins that permit the sections to pivot with respect to each other in a vertical and horizontal plane. Preferably, each finger includes a set of upper members pinned together at adjacent ends, and a set of lower members pinned together at adjacent ends. The upper members can be moved vertically with respect to the lower members to change the effective height of the fingers. Most conveniently, this movement is effected by an elongated hydraulic boot disposed between the upper and lower members.

Preferably, the adjacent top portions of the upper and lower members overlap to provide a substantially smooth and continuous surface between adjacent members. Thus, if a finger encounters a load heavier at one point than another, the upper member of the finger under the lighter load engages the adjacent upper member with the heavier load and helps supply lifting force where it is needed. The overlapping portions of the adjacent ends of the members also help prevent expansion of the hydraulic boot in between the adjacent members when the boot is inflated to move the upper members upwardly.

Preferably, each finger is mounted in the flat bottom bed of a carrier between adjacent laterally-spaced, elongated stationary ribs which have upper surfaces that project above the upper surfaces of the fingers when the fingers are in the collapsed or lowered position. When fluid pressure is supplied to the hydraulic boot between the upper and lower members, each upper member is lifted until its top surface is disposed above the adjacent surfaces of the stationary ribs, and can thus transfer a load from the stationary ribs to the fingers. Means are provided for sliding the fingers from the carrier bed to an adjacent second bed, say, in a warehouse or a truck, which has a second set of stationary ribs similar to those on the carrier bed. The fingers, carrying the load, slide between the second set of ribs and deposit the load on the ribs when pressure in the hydraulic boot is released, permitting the fingers to collapse. In this condiiton, the fingers can be withdrawn from under the load, leaving it on the second set of ribs.

In some instances, it is desirable to avoid the use of ribs; and in this case, the load is placed on a support which has a lower portion that rests on the first bed, and a second portion which has a downwardly-facing surface overlying and spaced from the first bed. A "wing" pallet is a typical example of such a support. One or more fingers, which can be expanded vertically, are disposed under the downwardly-facing surface of the support, and expanded so a lower portion of the finger engages the first bed and an upper portion of the finger engages the support and lifts it from the first bed. Means are provided for sliding the expanded finger, support, and load from the first bed onto a second bed. Thereafter, the finger is collapsed so the support and load are disposed on the second bed.

In another form of the invention, the fingers do not move. Instead, they carry rollers on the upper members, and the rollers are raised and lowered to engage or release loads or supports above them. This arrangement is used either with or without adjacent stationary ribs, depending on whether or not wing pallet-type supports are used for the load.

It is often convenient to be able to convert the first and second beds to a conventional flat surface. To facilitate this operation, the ribs are preferably releasably held in place by locating pins which engage both the ribs and the bed. In those cases where the fingers do not move but carry rollers on their upper members, the fingers are also removably installed and held in place by locating pins which engage the fingers and the bed on which the fingers rest.

In yet another form of the invention, the fingers are disposed between adjacent ribs, and the upper members of the fingers are movable between a level substantially flush with the adjacent surfaces of the ribs, and a level substantially below that. With the fingers in the expanded or upper position, the load is moved into place on tines which carry rollers that ride on the raised fingers. When the load is in proper position, the fingers are collapsed so that the load is transferred from the tines on the rollers to the adjacent surface of the ribs. Thereafter, the tines are withdrawn from under the load. If desired, the fingers are thereafter expanded so that they are flush with the adjacent surfaces of the ribs and provide a substantially continuous flat surface to support the load. The fingers can also be placed in the same condition when no load is on the fingers or ribs to provide a substantially flat bed as appears in a conventional warehouse or truck.

To facilitate assembling loads to be transferred from one bed to another, the invention provides an accumulating system which has a "live" surface, i.e., a surface on which loads or individual articles can easily slide. In one embodiment, the live surface for the ribs is provided by an endless chain over sprockets at each end of each rib. The chain is either driven or idling so that the load can be carried positively or easily pushed along the rib. In another form, the ribs carry a plurality of rollers mounted on the upper surface of each rib to rotate about the horizontal axis perpendicular to the longitudinal axis of the ribs. In this way, loads can easily be moved on the ribs over the areas between adjacent ribs into which the expandable fingers are fitted to subsequently engage the load or articles.

These and other aspects of the invention will be more fully understood from the following detailed description and the accompanying drawings, in which:

FIG. 2 is a view taken on line 2—2 of FIG. 1B.

FIG. 3 is a plan view of the rear portion of the apparatus;

FIG. 4 is a view taken on line 4—4 of FIG 3;

FIG. 5 is a fragmentary view taken on line 5—5 of FIG. 2;

FIG. 6 is a perspective view of one of the lower members of the sections in a flexible finger;

FIG. 7 is a schematic transverse sectional view of an alternate embodiment of the invention in which the expandable fingers do not move and do not require adjacent ribs;

FIG. 8 is a transverse sectional view of an embodiment of the invention in which the expandable fingers do not move and carry rollers on the upper surfaces to facilitate movement of the load;

FIG. 12 is a fragmentary sectional elevation of a preferred form of a collapsible support for use with the loading apparatus;

FIG. 13 is a view taken on line 13—13 of FIG. 12;

FIG. 14 is a view taken on line 14—14 of FIG. 13;

FIG. 15 is a view taken on line 15—15 of FIG. 13;

FIG. 16 is a side elevation, partly broken away, of aligning and locking means for a carrier and a truck; and FIG. 17 is a view taken on line 17—17 of FIG. 16.

Figure 1A:
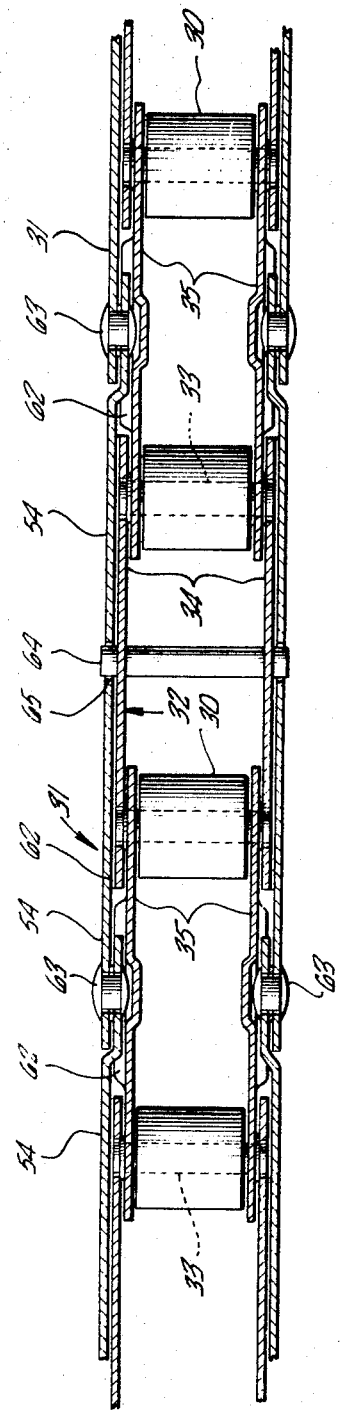
FIG. 1A is a fragmentary longitudinal sectional view of the forward portion of the apparatus.
Figure 1:
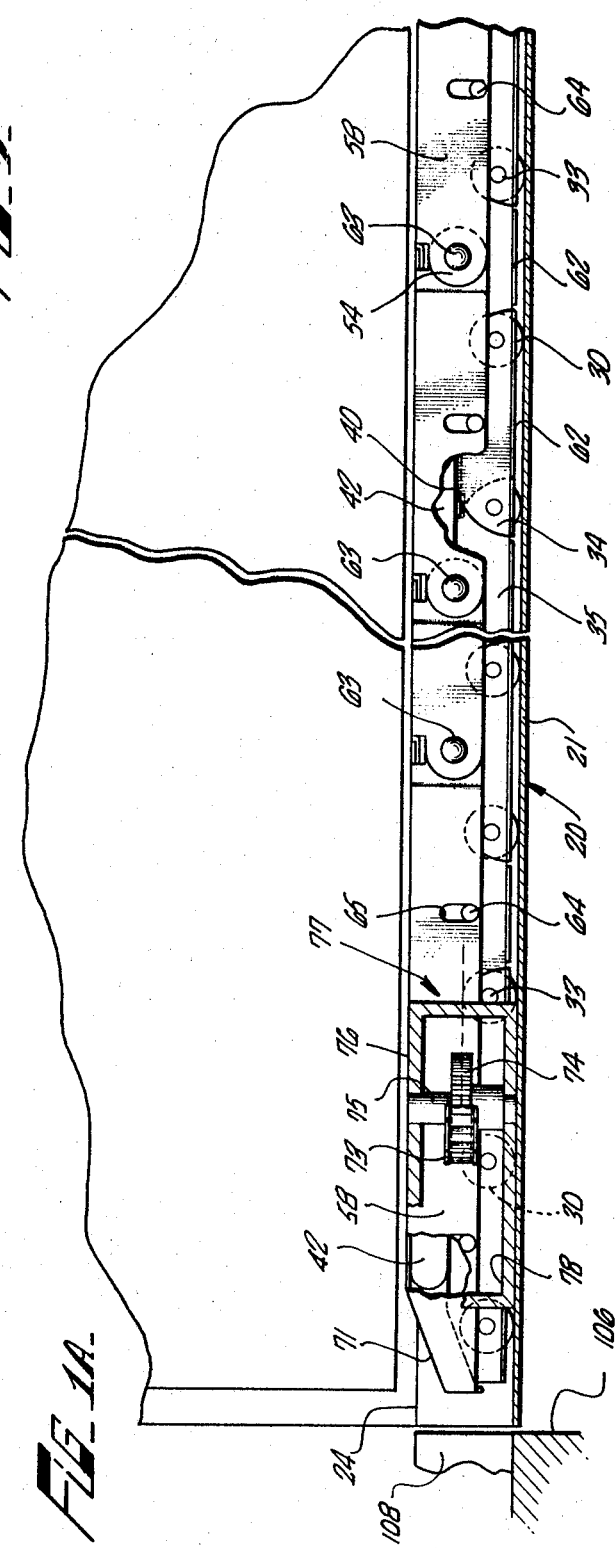
FIG. 1B is a fragmentary longitudinal sectional view of the rear portion of the apparatus.

Referring to FIGS. 1A, 1B, 2 and 3, the load handling apparatus of this invention includes a carrier 20 with a horizontal bottom bed 21 and upright side walls 22. A plurality of elongated and laterally spaced raised ribs 24 are on the top surface of the bed to leave a plurality of elongated, longitudinally extending, laterally spaced grooves 26 between adjacent ribs. The ribs extend from the forward (left, as viewed in FIGS. 1A and 1B) end of the carrier 20 to the rear end of the carrier bed.

A separate, elongated finger 28 is supported on rollers 30 in each groove 26. Each finger is made up of a plurality of elongated upper members 31 and lower members 32 disposed end to end and connected together at adjacent ends so the members are free to pivot with respect to each other about horizontal transverse axes. Each lower member 32 is a downwardly-opening U-shaped channel with a roller 30 journaled on a respective shaft 33 secured at each end of the lower member. As shown best in FIG. 5, every other lower member has vertical side walls 34 which are spaced slightly farther apart than vertical side walls 35 of the adjacent lower members. In this way, the more closely-spaced side walls 35 fit in between the more widely-spaced side walls 34 at each roller 30, and the overlapping portions of adjacent members are pinned together by a common shaft 33 which permits the members to pivot with respect to each other about the shaft. Each shaft 33 makes a tight fit at each end in the respective inner wall and a loose fit through the respective outer wall of the adjacent ends of the upper members to provide for horizontal and vertical flexibility of the fingers.

Each lower member has a horizontal top wall 36 formed integrally with the side walls in that lower member. As shown best in the perspective view of FIG. 6, each lower member has formed at one end of its horizontal top wall 36 a downwardly- and forwardly-extending tongue 38 which fits under the top wall of the adjacent lower member, which, in turn, has a similar tongue that fits under the top wall of the next member.

An elongated, continuous protective flexible strip 40 is disposed on the top surfaces of the top walls of the lower members of each finger, and a separate, elongated expandable hose or boot 42 is disposed on top of each strip on each finger. A similar strip 41 (FIG. 2) is used on the top of the boot to protect it from chafing against the underside of the upper members at joints. The forward end of each hose is sealed and located at the forward end of its respective finger. Each hose or boot extends for substantially the entire length of the finger and is connected at its rear end by a respective fitting 44 to a horizontal transverse manifold tube 46 welded to the forward surface of a transverse manifold plate 48 secured by bolts 50 to separate, respective downwardly-extending blocks 51 mounted on the top wall of the rear end of each rearmost lower member and each finger. Each block 51 is sufficiently high so that the lower surface of the transverse manifold bracket is spaced above the top surfaces of the ribs 24. The interiors of the hoses are supplied hydraulic fluid or air under pressure from a source (not shown) connected to the manifold pipe through valving (not shown) and a supply line 52.

Each upper member includes a top wall 56 which rests on the boot and which is formed integrally with a pair of downwardly-extending side walls 58 that fit over the outside of the side walls 34 and 35 of the lower member sections. The lower edges of the side walls of the upper members rest on outwardly-extending flanges 62 formed integrally on the lower edges of the side walls of the lower members. Each flange 62 on each narrow lower member terminates short of the ends of that member so as not to interfere with the overlapping relationship of the ends of that member with the adjacent ends of the wider lower members, as shown in FIG. 5. The flanges 62 limit the lower travel of the upper members with respect to the lower members when the hydraulic boot is in the collapsed or unpressurized condition shown in FIG. 2. This prevents the boot from being crushed or punctured by excessive loads, or even moderate loads, in case of fluid or air pressure failure. The flexible sheet 40 which covers the joints between adjacent ends of the lower members prevents the boot from being pinched or cut at the joints of those members.

As shown best in FIG. 5, the rear end of each upper channel member is of reduced width so that it fits within the forward portion of the adjacent upper channel member. The overlapping adjacent ends of the upper channel members are secured together by pivot pins 63 which make a loose fit through the upper channel members to permit the upper channel members to pivot with respect to each other about horizontal and vertical transverse axes. For convenience, each upper channel member is about twice as long as the lower channel members, and they are pinned together at the central portion of the narrower lower channel members. This ratio is not critical, and the upper members can be any desired convenient length.

The upward travel of the upper members with respect to the lower members is limited by a separate, transverse, horizontal restraining pin 64 secured to and extending through each wider lower member. Each pin 64 projects out each side of the member into a separate, respective vertical slot 65 formed in each side wall of each upper member. The restraining pins prevent overexpansion of the boot in case excessive hydraulic fluid pressure is applied to the boot interior, and it also prevents the upper member from being lifted up off the lower member due to excessive pressure within the boot. This feature is particularly important when handling varying loads along the length of the fingers. For example, relatively heavy articles may be loaded on one part of the fingers and substantially lighter articles at some distance from the heavy ones. In this case, relatively high fluid pressure would have to be applied to the hydraulic boot to lift the heavy portion of the load. If the fingers under the lighter load were not restrained, they could be lifted sufficiently to carry them off the lower members and perhaps permit the boot to burst, or cause the boot to be pinched by misaligned upper members when they come back down. The restraining pins in the slots also cooperate with the flanges 62 to limit the downward travel of the upper members on the lower members.

FIGS. 1A and 1B show the boot in the expanded position with the upper members lifted to their maximum height. When the pressure is released in the boots, the upper members settle to the dotted line level 66 shown in FIG. 1B. FIG. 2 shows the level of the upper members when the boots are in the collapsed position. The upper members are raised to the dotted line level 67 shown in FIG. 2 above the adjacent surfaces of the ribs 24 when pressure is applied to the boots. Conversely, when the boots are collapsed, the upper surfaces of the upper members lie below the adjacent top surfaces of the ribs. In this way, a load shown in FIG. 2 on the carrier bed is transferred between the ribs and the fingers by raising or lowering the fingers with the application or release of hydraulic pressure to and from the boots.

The rearmost upper channel members terminate at their rear ends just forward of the manifold pipe and are tied together by horizontal, transverse tie bar 68, which conveniently is an angle iron secured to the upper members by bolts 69 and nuts 70. The forward ends of the foremost upper members terminate at the forward end of the carrier and are declined forwardly and downwardly to form an inclined slope 71 which facilitates entrance of the fingers under a load as subsequently described.

The fingers are moved back and forth in the channels by a pair of endless right and left drive chains 72 and 73, respectively, or other suitable means, such as racks and pinions, etc. The drive chains are substantially identical in construction and arrangement, so only the left drive chain 73 is described in detail for brevity. The forward portion of the left drive chain is disposed around a forward idler sprocket 74 mounted on a vertical shaft 75 journaled at its upper end in a top wall 76 of a box 77 and in a bottom wall 78 of the box. The box 77 is located at the forward end of the rib located at the extreme left side (right side, as viewed in FIG. 2) of the carrier bed. The sides of the box are open so the chain can pass into one side, around the sprocket, and out the other side. The rib at the extreme left side of the carrier terminates short of the forward end of the carrier, and the box extends from the forward end of the rib on the extreme left to terminate flush with the forward ends of the other ribs. One end of the left drive chain 73 is secured by a first pin 80 to the forward ends of a pair of outwardly-extending horizontal upper and lower plates 81 and 82, respectively, secured to the left side of the rearmost lower channel member in the finger second from the left. The left drive chain 73 extends forwardly along the right side of the rib 24 on the extreme left of the carrier, around the forward sprocket 74, back along the left side of the rib on the extreme left of the carrier, around a left rear sprocket 83 mounted on an upright shaft 84 journaled in a left rear box 85 mounted on the carrier bed, and back to the rear portion of plates 81 and 82 where it is secured by a second pin 86.

A left drive sprocket 86A is secured to the vertical shaft 84 above the left rear sprocket 83 and is supplied power through a power chain 87 disposed around the left drive sprocket and a lower driving sprocket 88 secured to the lower end of a vertical drive shaft 89 of a conventional gear reduction box 90 powered by a conventional reversible electric motor 91 mounted on the rear portion of the ribs of the carrier. A right drive chain 92 is disposed around an upper driving sprocket 93 on the gear reduction drive shaft 89 and around a right drive sprocket 94 mounted on a vertical shaft 95 in a box 96 on the right rear side of the carrier bed. A right rear sprocket 98 mounted below the right drive sprocket on the shaft 95 supports the rear portion of the right drive chain 72 which is mounted and secured to the rearmost lower member of the extreme right finger on the carrier bed exactly as previously described for the left drive chain 73.

A vertical buckboard 99 is secured to the tie bar 68 to provide a surface against which the load can be braced.

The power-driven, straddle-type carrier is supported for movement on four pneumatic wheels 100 which are steerable. Each wheel is mounted near a respective corner of the carrier. For brevity, the mounting of only one of the wheels is described in detail. The other three are identical. Each wheel is mounted on the lower end of a vertical piston rod 101 which extends up into a vertical cylinder 102 secured by brackets 103 to the outside of the carrier side wall 22. Fluid pressure is supplied through separate valves (not shown) for each wheel cylinder, either to the lower end of the cylinder through a fluid line 104 or to the upper end of the cylinder through line 105. In this way, each corner of the carrier can be raised and lowered independently of the other three corners, thus permitting the carrier to be adjusted about three mutually-perpendicular axes to facilitate alignment of the carrier bed with the area which the load is to be moved onto or off of. The carrier bed may also be raised from ground level to truck or dock height by simultaneously actuating the proper valves for all four cylinders.

As shown best in FIGS. 1A and 1B, a warehouse floor or truck bed 106 is adjacent the forward end of the carrier and has a plurality of stationary ribs 108 which are the same height as the ribs on the carrier bed. Each rib on the warehouse bed or truck floor is collinear with a corresponding rib on the carrier bed.

To transfer the load from the carrier bed to the warehouse floor or truck bed, the power-driven carrier is maneuvered into position on the pneumatic tires and adjusted so that the ribs on the carrier are substantially at the same level and collinear with those on the warehouse or truck floor. Fluid pressure is supplied to the interior of the hydraulic boots to lift the upper channel members so they engage the lower surface of the load and lift it up off of the top surfaces of the ribs on the carrier bed. The electric motor or other power source on the carrier is then turned on so that the drive chains are moved to slide the fingers on their respective rollers out of the carrier bed and onto the warehouse floor or truck bed. Each finger moves into a respective space between adjacent ribs on the warehouse floor. The fingers are advanced until the rear portions of the upper members are almost to the end of the carrier bed, or until all of the load on the fingers is over the ribs on the warehouse or truck floor. The electric motor is then turned off, stopping the drive chains and fingers. The pressure of the hydraulic fluid in the boot is then reduced so the boot collapses and the upper channel members lower to the level of dotted line 66 of FIG. 1B. This places the upper surfaces of the upper channel members below the upper adjacent surfaces of the ribs on the warehouse or truck floor, thus transferring the load from the fingers to the warehouse or truck floor ribs. The fingers are then retracted by operating the reversible power source in the reverse direction so that the drive chains pull the collapsed fingers back onto the carrier, which is now empty and ready to move to a new location to pick up an additional load. Alternatively, part of the load is transferred to the warehouse floor, and the balance of the load is retained on the carrier for transfer to a different area.

A load is picked up from the truck or warehouse floor and transferred to the carrier by reversing the above steps. The empty-carrier is aligned with the warehouse or truck floor, and the collapsed fingers are moved between adjacent ribs on the warehouse or truck floor and under the load. The articulated assembly of the members in the fingers permits them to follow the vertical contour of the warehouse or truck floor, even though it may not be perfectly level. The fingers are also flexible horizontally and may move slightly to the left or right to insure that they will not bind between the ribs due to a misalignment of carrier and ribs on the floor. This is particularly important to insure easy and complete insertion of the fingers as far as desired or required under the load, and without scraping or dragging against the load or floor ribs which might damage the load or the equipment. The fluid pressure is then supplied to the interior of the hydraulic boots so they expand and lift the load off the ribs on the warehouse floor. If one part of the load is heavier than another, the lighter part of the load tends to lift first, and at relatively low pressure inside the hydraulic boot. Additional pressure is required to lift the heavier portion of the load. The restraining pins 64 on the lower channel members prevent the upper channel members from lifting above the desired elevated level indicated by dotted line 67 in FIG. 2, and thus prevent the hydraulic boot from overexpanding or lifting the upper channel members off the lower channel members in the vicinity of the lighter portion of the load. This avoids damage to the boot, and possible inactivation of the fingers due to the upper channel members jumping off the lower members. The elongated flexible strips 40 underneath and on top of the boot prevent the joints between adjacent members from pinching or otherwise damaging the boot.

The overlapping top portions of the upper channel members and the pins which connect their adjacent ends together help transfer lifting force from one upper channel member to the adjacent channel member in the event of uneven distribution of the load.

Referring to FIG. 7, a load 120 (shown in phantom line only) is disposed on a conventional skid 121 which has a lower portion 122 adapted to rest on a horizontal bed 123. The skid also includes an outwardly-extending wing 124 which has a downwardly-facing bottom surface 126 which overlies the bed 123 and leaves a space 127 between them. A separate, elongated finger 125 is disposed under each wing of the skid and includes a lower channel member 128 which is U-shaped in cross section and opens upwardly. A hydraulic boot 130 is disposed in the lower channel member. An upwardly-opening upper channel member of U-shaped cross section channel member 129 is disposed in the lower channel member to rest on a hydraulic boot 130. A plurality of rollers 131 is mounted within the upper channel member so the top surfaces of the rollers are above the top edge of the upper channel member. Each roller is mounted on a respective transverse shaft 132 which extends through the roller, the side walls 133 of the upper channel member, and into a respective vertical slot 134 in each adjacent side wall 135 of the lower channel member. Each slot is closed by longitudinal segment 136 of the lower channel member to limit the upward travel of the upper channel member and rollers. The slot bottom 137 limits the downward travel of the upper member to prevent crushing of the boot.

Each finger is removably held in position on the bed by a downwardly-extending locating pin 138 which fits into an upwardly-opening socket 139 in the top surface of the bed 123. Thus, the fingers can quickly and easily be removed or installed wherever necessary.

The load is transferred to and from the bed 123 by actuating the hydraulic boot as previously described with respect to the apparatus shown in FIGS. 1 through 6. To set the load down on the bed, the pressure in the boot is released so that it collapses and lowers the rollers until their upper surfaces are substantially flush with the upper edges of the side walls of the lower member. This places the bottom of the skid on the bed 123, and leaves sufficient clearance between the top of the fingers and the lower surface of the skid to permit the fingers to be lifted and removed from the bed with the load left in place, if desired. To lift the load and remove it from the bed, the boots are pressurized until the rollers lift the kid off of the bed as shown in FIG. 7. Thereafter, the skids are moved along the rollers to the desired new location.

Instead of the construction shown in FIG. 7, the fingers can be of the type shown in FIGS. 1 through 6 and used with regular pallets. In this case, the fingers roll in and out as previously described, but stationary ribs on the beds of the carrier and the warehouse floor are required.

Referring to FIG. 8, the finger 125 is identical with that described with respect to FIG. 7. However, a conventional flat bottom pallet 140 rests on the rollers and is adapted to be lifted from or set on ribs 141 adjacent the fingers. In this case, the ribs and fingers are removably installed in the truck or on the floor and held in position by locating pins 138 on both the ribs and fingers fitting into respective sockets 139.

The operation of the apparatus of FIG. 8 is similar to that of FIG. 7. The rollers are raised or rolled by operation of the hydraulic boot to transfer the load from or to the ribs. When the load is lifted by the rollers, it is free to be moved easily from over the ribs to a new location with the power-driven carrier.

Figure 9:
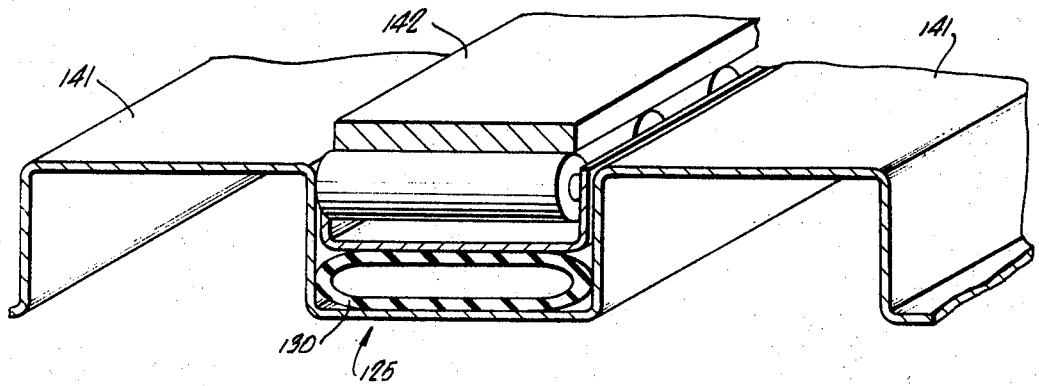
FIG. 9 is a schematic perspective view, partly in section, of an embodiment of the invention in which the load is carried on tines which ride on rollers carried by the upper member of the expandable fingers.

In the apparatus shown in FIG. 9, fingers 125 like those of FIGS. 7 and 8 are located between adjacent ribs 141. A separate, respective steel tine 142 is disposed on each finger to support a load (not shown) which rests on the tines, which, in turn, roll over the rollers when they are elevated by application of fluid pressure to the hydraulic boots.

Figure 10:
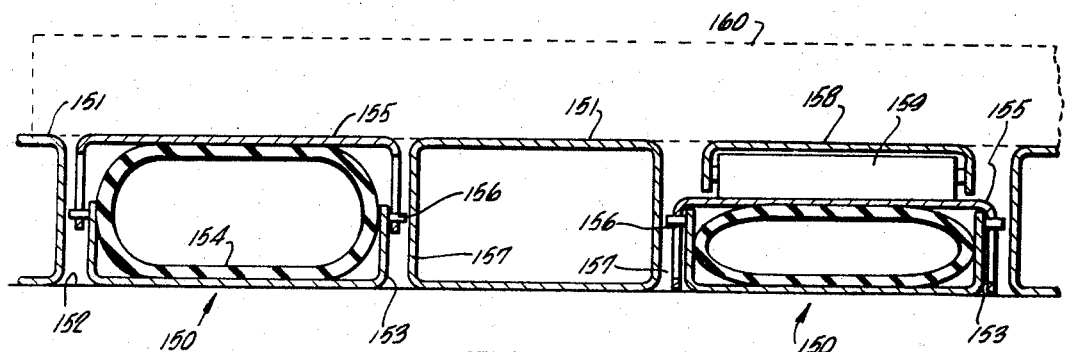
FIG. 10 is a schematic transverse sectional view of tines which carry rollers adapted to ride on the upper members of expandable fingers.

In the apparatus shown in FIG. 10, a separate, elongated finger 150 is mounted between adjacent elongated ribs 151 on a bed 152 of a truck or warehouse dock. Each finger includes a lower member 153 of upwardly-opening U-shaped cross section. An elongated hydraulic boot 154 is disposed in each lower channel member, and an upper channel member 155 of downwardly-opening U-shaped cross section is disposed on top of each lower channel member so that the side walls of the upper channel member make a close sliding fit outside the side walls of the lower channel member. An outwardly-extending restraining pin 156 at the upper edge of each lower channel member extends into a vertical slot 157 in the side wall of each corresponding upper member to terminate the upward travel of the upper member when the boot is expanded so that the top surfaces of the fingers 150 are flush with the top surfaces of the ribs 151. When pressure is released from the hydraulic boot, it collapses so that the upper member moves down to the position shown on the right side of FIG. 10. This leaves sufficient clearance for an elongated tine 158 mounted on rollers 159 to roll in on top of the collapsed finger and under a load 160 resting on the ribs. The tines with rollers can also be made to be flexible vertically and horizontally if desired. The load is lifted by expanding the boots so that the tines are lifted to raise the load off the ribs. Thereafter, the load is moved on the tines and rollers out of the area shown in FIG. 10. This leaves the area over the bed substantially flat because the top surfaces of the upper members are raised to be flush with the adjacent surfaces of the ribs so the bed can be used in a conventional fashion, if desired. A load is placed on the ribs by elevating the upper channel members, rolling the loaded roller tines onto the raised upper members, releasing pressure from the boots to lower the upper members and loaded roller tines until the load is transferred from the tines to the adjacent ribs. Thereafter, the tines are withdrawn, and the boots again pressurized to place a substantially flat support surface under the load.

Figure 11:
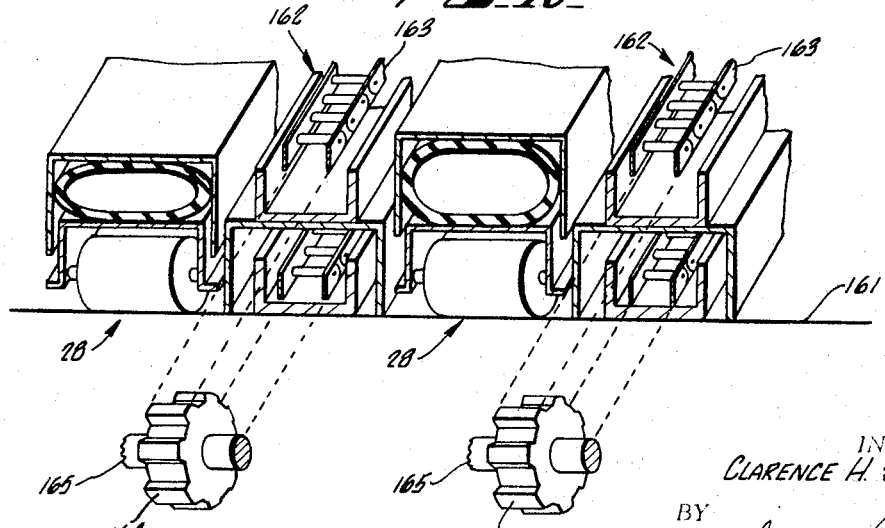
FIG. 11 is a perspective view of ribs in an accumulator area provided with live surfaces to facilitate movement of loads on the ribs.

The apparatus in FIG. 11 is useful for accumulating and moving loads into position for pick up by or transfer from the hydraulic fingers 28 which fit between adjacent ribs 162 that have endless chains 163 mounted to slide over top and bottom surfaces of the ribs around sprockets 164 mounted to rotate on transverse horizontal shafts 165. With this arrangement, loads are conveyed on the chains to the area over the collapsed fingers, which are then expanded to lift the load from the chains and transfer it to a carrier or other area. The fingers of FIG. 11 are identical with those described in detail with respect to FIGS. 1 through 6. The load is transferred from the expanded fingers by rolling them onto the bed 161 on which the conveyor chains are mounted. The fingers are collapsed to transfer the load from the fingers to the conveyor chains, and thereafter the load is moved away on the conveyor chains.

FIGS. 12 through 15 show a preferred form of a collapsible support or retaining cage 180 mounted on a wing-type pallet for use with the loading apparatus to move large loads safely and quickly. It is common practice to stack boxes and the like on pallets. Such loads can be stacked relatively high and can be interlocked for stability, if the articles are of uniform size. However, when the articles are of various sizes or shapes, the load is often unstable and has to be supported by walls or the like secured to the pallet.

As shown in FIGS. 12 through 15, the retaining cage 180 is releasably secured to a conventional wing pallet 183 which includes a flat bottom board 184, a plurality of upright spacers 185 secured to the bottom board, and a top board 186 secured to the top of the spacers. The bottom and top boards are each square in plan view, but the top board is several inches longer on each edge than the bottom board to provide an overhanging wing 187 of uniform width around the entire periphery of the pallet.

The collapsible cage includes a pair of U-shaped frames 190, each having an elongated horizontal base 192 channel-shaped cross section and of a length equal to an edge of the top board of the pallet. As shown best in FIG. 12, each frame base 192 includes a horizontal top plate 193 which rests on the top surface of one edge of the pallet top board. A vertical end plate 194 is formed integrally at its upper end with the outside edge of top plate 193, and fits snugly against the vertical face of one edge of the pallet top board. The lower edge of the vertical plate 194 is formed integrally with the outer edge of a lower horizontal plate 195 which makes a close fit against the undersurface of the top board of the pallet under the top plate 193. As shown best in FIG. 12, the top plate 193 of the frame base is wider than the bottom plate to facilitate installing and removing the cage on and from the pallet as described in detail below. Each corner of the pallet top board has a notch 196 (shown only in the lower left corner of FIG. 15) which receives the lower end of a respective vertical frame post 198 which extends down through each end of the top plate 193 to rest on the bottom plate 195 at each corner of the pallet top board. The lower end of each upright post is welded to the top plate and bottom plate of the frame base 192.

As shown in FIGS. 12 and 15, the two frames are mounted on opposite edges of the top board of the pallet to face each other. An upright, rectangular screen 200 made of expanded flattened metal mesh is spot-welded along its edges to each of the upright posts on each frame. A horizontal brace 201 is welded at its ends to intermediate portions of the upright posts on each frame for added strength and rigidity. Other horizontal or vertical members may be used in place of mesh, if desired.

Each base is prevented from sliding outwardly with respect to the pallet by a vertical pin 202 which extends down through an opening 204 at each end of each top plate and into a bushing 206 press fitted into the top board of the pallet. The pin makes a loose fit through the opening and a close fit into the bushing. An enlarged round head 208 on the upper end of the pin rests on the top plate and limits the downward travel of the pin into the bushing. A separate retaining chain 210 is welded at one end to each pin head and at its other end to a point near the lower end of each adjacent post to prevent the pin from being lost when not in use.

As shown best in FIG. 14, adjacent posts in the opposing frames are connected and braced together by a pair of crisscrossing belts 212, the length of which is adjustable with buckles 213 for any desired tension.

A spacer arm 216 is connected by a horizontal pivot pin 218 to the upper end of one post in each frame, the pivot pins being located in the upper ends of posts disposed diagonally with respect to each other across the pallet. As shown best in FIG. 13, each spacer arm has an inverted L-shaped cross section which opens inwardly and downwardly with respect to the cage. The end of each spacer arm remote from its respective pivot pin carries a downwardly-extending locating pin 220 which fits down into a vertical recess 222 in the upper end of the opposite post of the opposing frame. Thus, the two frames are locked rigidly by the belts and the spacer arms to form a sturdy cage in which articles of varying sizes and shapes can be stacked and moved without spilling or dumping the stack.

The pallets are raised and lowered by elongated fingers 224 similar to those described in detail with respect to FIGS. 7 and 8. Each finger has a lower upwardly-opening U-shaped channel member 226 with downwardly-extending locating pins 228 (only one pin is shown on each finger in FIG. 12) which fit into upwardly-opening sockets 230 in the top surface of a truck bed or dock floor 232. An upwardly-opening U-shaped upper channel member 234 is disposed in each lower channel member and rests on an inflatable flexible boot or tube 236 which is actuated as previously described for the boots in FIGS. 1 through 11. A plurality of longitudinally-spaced rollers 238 are mounted on horizontal, transverse shafts 240 journaled in the upper members 234. Horizontal, transverse stop pins 242 are secured at longitudinally-spaced locations across the bottom of the upper channel members and project outwardly from each side of the upper channel members into vertical slots 244 which limit vertical movement and which begin adjacent the upper end of each side of each upper channel member and which terminate slightly below the midpoint of each side of each upper channel member. As shown in FIG. 12, each finger is in its collapsed position with the stop pins 242 resting on the bottom of the vertical slots 244. In this condition, the bottom board of the pallet rests on the truck bed, and the rollers 238 are spaced below the pallet wings. When the boot 236 is inflated by the application of fluid pressure as described with respect to FIGS. 1 through 11, the boot expands and lifts the upper member until the stop pins engage the upper ends of slots 244. This causes the rollers to engage the bottom plate 195 on the frames, and lift the pallet off the truck or dock floor so the pallet can be moved longitudinally along the fingers on the rollers.

If desired, the lower plate 195 can be eliminated to reduce the weight and cost of the cage assembly. This arrangement is convenient when conventional pallets are used, i.e., pallets which do not have overhanging wings to fit between the upper and lower plates. However, the lower plate is preferred because it provides a more secure installation, and a wear surface which rides on the rollers and extends the life of the pallets which are usually made of wood.

To remove the cage from the pallet after a load has been taken off the pallet, the retaining pins 202 are pulled from their respective symmetrically-placed bushings by the retaining chains secured to the pins. The belts are unbuckled, and the spacer arms 216 lifted up to disengage the locating pins 220 from the sockets in the upper ends of the posts. The frames are then moved outwardly from the pallet so the bases slide off the opposing edges of the pallet. The cage is quickly installed in the position shown in FIGS. 12 through 15 by reversing the foregoing process. The more narrow lower plates 195 on the frame bases facilitate fitting the bases over the opposite edges of the pallet top board. Preferably, each base is the same length as each edge of the top board to facilitate aligning the holes in the top plates of the bases with the bushings in the pallet top board.

As shown best in FIG. 15, the square shape of the top pallet board makes the cage assembly symmetrical so that it can be assembled on either pair of the opposing edges of the pallet.

The use of the rollers, as shown in FIG. 12, with the pallet eliminates the need for a dock at the same height as the truck bed to permit a conventional forklift or pallet jack to move in and out of the truck. Instead, the pallets can be simply rolled to the rear of the truck where they are then lifted from the fingers by a conventional forklift which can be at ground level or any level lower than that of the truck bed.

With the collapsible cage as shown in FIGS. 12 through 15, after a load is delivered, the cages can be quickly disassembled and removed from the pallets so the pallets and cages can be stored in a fraction of the space required when in the assembled condition. This permits the truck space to be utilized in carrying loads on return trips when the pallets are not needed.

FIGS. 16 and 17 show a carrier 20 of the type described with respect to FIGS. 1 through 6 positioned to transfer a load 246 resting on fingers 28 disposed between the ribs 24 on the carrier bed 21 to a truck 248 with a bed 249 on which raised ribs 250 are mounted as described with respect to FIG. 1A. A plurality of horizontally spaced sockets 252 are mounted across the rear edge and bottom of the truck bed 249. Each socket includes a rearwardly-opening recess 253 of circular cross section and which tapers outwardly and rearwardly at 253A to receive a respective pin 254 tapered to mate in each recess and mounted on a respective bracket 255 along the forward and bottom edge of the carrier bed 21.

When the carrier is maneuvered into the position shown in FIG. 16, i.e., with the carrier fingers collinear with the grooves between adjacent ribs 250 on the truck bed, the pins 254 each enter a respective recess in a socket 252 and lock the carrier and truck beds together so they cannot move vertically or horizontally with respect to each other. The pins 254 and sockets 252 also insure positive alignment of each finger with a respective groove between adjacent ribs on the truck bed. The load is lifted from the stationary ribs on the carrier bed by expanding the fingers as previously described. The fingers are then moved forward so the load is transferred from the carrier bed onto the truck bed. The fingers are then lowered or collapsed so the load is transferred from them to the ribs on the truck bed. The interlocking sockets and pins on the truck bed and the carrier bed restrain the truck and carrier against vertical movement with respect to each other during the transfer of the load from the carrier to the truck, and thereby prevent gross vertical misalignment of the two beds during the transfer of the load between them.

The foregoing examples show the versatility and utility of the apparatus of this invention in transferring large loads of diffeernt or same articles quickly and easily from one area to another. The flexibility of the articulated fingers permits them to move easily and quickly over the typically uneven surfaces encountered in many commercial installations. The stop pins to limit the upward travel of upper channel members with respect to the lower members prevent inadvertent damage to the boot and undesired lifting of the upper members off the lower members, and more uniformly distribute the force of the hydraulic boot to the load. The independent vertically-adjustable pneumatic wheels on the hydraulic cylinders permit the carrier to be aligned quickly with all types of warehouse docks, trucks, etc., even though such devices may have inclined or uneven surfaces.

Mechanically adjustable power-driven jackscrews may be substituted for the hydraulic cylinder mounted wheels if desired or the power-driven jackscrews may be added to the carrier frame so as to make a more positive vertical alignment between carrier and dock when transferring loads from one to the other.

I claim:
1. Apparatus for transferring a load from a first bed to a second bed, the apparatus including means for moving one of the beds toward and away from the other bed, means for moving the load from one bed to the other, a socket mounted on the first bed to open toward the second bed, the socket including an outer portion which tapers outwardly toward the second bed and an inner portion joining the outer, the inner portion of the socket being less tapered than the outer, the socket being continuous in a direction around a substantially horizontal axis, and a pin mounted on the second bed to extend toward the socket, the outer end of the pin including a portion tapered less than the outer portion of the socket and shaped to fit in the inner portion of the socket as the beds are moved together to lock the two beds against relative vertical and horizontal movement as the load is transferred from one bed to the other.

2. Apparatus according to claim 1 in which the inner portion of the socket is circular in cross section.

3. Apparatus according to claim 1 in which the inner portion of the socket is circular in cross section, and the outer portion of the pin is shaped to make a close fit in the inner portion of the socket.

4. Apparatus according to claim 1 in which the inner portion of the socket is collinear with the outer portion of the socket.

References Cited
UNITED STATES PATENTS

| | | | |
|---|---|---|---|
| 1,816,041 | 7/1931 | Denehie | 214—38 |
| 2,143,285 | 1/1939 | Schofield. | |
| 2,820,642 | 1/1958 | Harper. | |
| 2,828,027 | 3/1958 | Stevenson et al. | 214—38 |
| 2,831,588 | 4/1958 | Seed. | |
| 3,130,829 | 4/1964 | Long | 193—35 |
| 3,213,993 | 10/1965 | Long | 193—35 |
| 3,228,542 | 1/1966 | Achammer | 214—516 |
| 3,313,429 | 4/1967 | Cole | 214—38 |
| 3,337,066 | 8/1967 | Reed et al. | 214—38 |

ROBERT G. SHERIDAN, *Primary Examiner.*

U.S. Cl. X.R.
193—35; 214—84, 516